US009579945B2

(12) United States Patent
Germain et al.

(10) Patent No.: US 9,579,945 B2
(45) Date of Patent: Feb. 28, 2017

(54) HYDRAULIC SUSPENSION SYSTEM

(71) Applicants: Philippe Germain, Fontenay-Sous-Bois (FR); Aurelien Fourmy, Villeparisis (FR)

(72) Inventors: Philippe Germain, Fontenay-Sous-Bois (FR); Aurelien Fourmy, Villeparisis (FR)

(73) Assignee: BeijingWest Industries Co., Ltd., Beijing (CN)

( * ) Notice: Subject to any disclaimer, the term of this patent is extended or adjusted under 35 U.S.C. 154(b) by 0 days.

(21) Appl. No.: 14/414,553

(22) PCT Filed: Mar. 27, 2013

(86) PCT No.: PCT/CN2013/073245
§ 371 (c)(1),
(2) Date: Jan. 13, 2015

(87) PCT Pub. No.: WO2014/153730
PCT Pub. Date: Oct. 2, 2014

(65) Prior Publication Data
US 2015/0202940 A1    Jul. 23, 2015

(51) Int. Cl.
*B60G 17/08* (2006.01)
*B60G 17/018* (2006.01)
(Continued)

(52) U.S. Cl.
CPC ........... *B60G 17/08* (2013.01); *B60G 17/018* (2013.01); *B60G 17/0152* (2013.01);
(Continued)

(58) Field of Classification Search
CPC .. B60G 17/08; B60G 17/018; B60G 17/0152; B60G 17/04; B60G 17/056;
(Continued)

(56) References Cited

U.S. PATENT DOCUMENTS 4,519,627 A    5/1985  Shibahata et al.
4,958,850 A *  9/1990  Buma .................... B60G 17/04
                                              280/124.161
(Continued)

FOREIGN PATENT DOCUMENTS

CN    1325799 A    12/2001
CN    1533479 A     9/2004
(Continued)

OTHER PUBLICATIONS

European Search Report; Dated Apr. 19, 2016, 7 Pages.
(Continued)

*Primary Examiner* — Barry Gooden, Jr.
(74) *Attorney, Agent, or Firm* — Dickinson Wright PLLC

(57) ABSTRACT

Provided is a continuous hydraulic suspension system which has, in each front and rear valve block (25, 26), an Energy Management Valve (EMV) (27, 28) and Check Valves (CV) (29, 30, 31, 32) to provide re-circulation of oil in the resistive mode. The system allows reduced energy consumption during non-motoring modes, and enables a smaller capacity pump and/or an electric motor pump to be used.

20 Claims, 13 Drawing Sheets

(51) Int. Cl.
B60G 17/04 (2006.01)
B60G 17/056 (2006.01)
B60G 17/015 (2006.01)

(52) U.S. Cl.
CPC ........... *B60G 17/04* (2013.01); *B60G 17/056* (2013.01); *B60G 2202/24* (2013.01); *B60G 2400/5122* (2013.01); *B60G 2400/5182* (2013.01); *B60G 2500/114* (2013.01)

(58) Field of Classification Search
CPC ........ B60G 2202/24; B60G 2400/5122; B60G 2400/5182; B60G 2500/114
See application file for complete search history.

(56) References Cited

U.S. PATENT DOCUMENTS

| | | | | |
|---|---|---|---|---|
| 5,036,750 A * | 8/1991 | Katayama | ............ | B60G 17/005 137/596.2 |
| 5,076,606 A * | 12/1991 | Takahashi | ............ | B60G 17/018 280/124.161 |
| 5,083,811 A * | 1/1992 | Sato | ............ | B60G 17/018 280/124.16 |
| 5,085,459 A * | 2/1992 | Sato | ............ | B60G 17/018 280/5.5 |
| 5,117,950 A * | 6/1992 | Kobayashi | ............ | B60G 17/005 188/300 |
| 5,152,547 A * | 10/1992 | Davis | ............ | B60G 17/018 188/313 |
| 5,178,402 A * | 1/1993 | Love | ............ | A01D 75/28 180/41 |
| 5,348,338 A * | 9/1994 | Kuriki | ............ | B60G 17/0152 280/124.141 |
| 5,351,790 A * | 10/1994 | Machida | ............ | B60G 13/003 188/266.2 |
| 6,321,887 B1 * | 11/2001 | Kurusu | ............ | B60G 17/018 188/266.2 |
| 6,467,748 B1 * | 10/2002 | Schick | ............ | B60G 17/0165 248/550 |
| 2004/0160032 A1 | 8/2004 | Brandenburger | | |
| 2005/0040610 A1 * | 2/2005 | Brandenburger | ...... | B60G 17/04 280/5.5 |
| 2005/0225048 A1 * | 10/2005 | Kasamatsu | ........ | B60G 17/0162 280/124.16 |
| 2006/0151233 A1 * | 7/2006 | Kawashima | ......... | B62D 7/1509 180/414 |
| 2007/0045067 A1 * | 3/2007 | Schedgick | ......... | B60G 17/0152 188/266 |
| 2010/0201181 A1 * | 8/2010 | Pope | ..................... | E04G 23/006 299/37.1 |
| 2011/0095494 A1 * | 4/2011 | White | .................. | B60G 17/056 280/5.509 |
| 2011/0187065 A1 * | 8/2011 | Van Der Knaap | . | B60G 17/0152 280/5.507 |
| 2012/0160620 A1 * | 6/2012 | Yamashita | ............. | B60G 13/08 188/266.5 |
| 2012/0305347 A1 * | 12/2012 | Mori | ...................... | B60G 17/08 188/266.2 |
| 2012/0305348 A1 * | 12/2012 | Katayama | .............. | B60G 17/08 188/266.2 |
| 2013/0275003 A1 * | 10/2013 | Uchino | .................. | B60G 17/06 701/40 |
| 2015/0217621 A1 * | 8/2015 | Yamashita | ............. | B60G 13/08 188/266.2 |

FOREIGN PATENT DOCUMENTS

| | | |
|---|---|---|
| DE | 102009023419 A1 | 12/2010 |
| EP | 1900555 A2 | 3/2008 |
| JP | H05221212 A | 8/1993 |
| JP | 2000264034 A | 9/2000 |

OTHER PUBLICATIONS

State Intellectual Property Office of China, Search Report, Dated Aug. 31, 2016, 4 Pages.
State Intellectual Property Office of China, First Notification of Office Action, Dated Aug. 31, 2016, 9 Pages.

* cited by examiner

HYDRAULIC SUSPENSION SYSTEM

CROSS REFERENCE TO RELATED APPLICATION

This application claims the benefit of PCT International Application Serial No. PCT/CN2013/073245 filed on Mar. 27, 2013 and entitled a "Hydraulic Suspension System".

FIELD OF THE INVENTION

The present invention relates to a hydraulic suspension system for vehicles and methods for operating such systems.

BACKGROUND OF THE INVENTION

There is one form of hydraulic suspension system known as the dis-continuous system in which a pressure control valve regulates a controlled pressure by throttling pump flow to tank. A directional control valve (DCV) connects the controlled pressure to one chamber (e.g. chamber "A") of a double effect actuator while connecting the other chamber of the actuator (e.g. chamber "B") to tank, thus generating a load in one direction. To exert the load in the other direction, the directional control valve is switched position, connecting the controlled pressure to chamber "B" of the actuator and chamber "A" to tank. Thus, when the actuator is in the resistive mode (it travels in the opposite direction to the load it exerts) the flow out of the chamber which has its pressure regulated by the pressure control valve is re-circulated to the other chamber via the pressure control valve (PCV) and the directional control valve (DCV). As the pump has fixed displacement, and the PCV is throttling the flow to tank, power is still consumed by the system.

When this form of hydraulic suspension system is used with 2 actuators (generally one on the front and one on the rear), it is duplicated and uses a flow divider to share the pump flow between the front and rear systems.

A third dis-advantage is that the pressure control valve has a minimum controlled pressure relative to the tank pressure. Hence when the directional control valve is switched, it creates some discontinuity in the load exerted by the actuator. Discontinuity in flow will also occur with possible noise issues. To minimize those discontinuities, synchronization between the pressure control valve and the directional control valve is required, ensuring that the pressure control valve is regulating its minimum controlled pressure whilst switching the directional control valve.

In this form, when the system is required to change the controlled load, it regulates the pressure via the pressure control valve, changing the pressure in the "primary" circuit (hydraulic line from the pump outlet to the pressure control valve). The more compliance in the primary circuit, slower the system will be to increase the controlled pressure and the load which can be controlled by the system.

In another hydraulic suspension arrangement known as the continuous system, a PCV regulates the pump pressure, and pressure reducing valves (PRVs) regulate the actuator chamber pressures to change load without causing any flow/pressure discontinuity. All actuator chambers are controlled, and so load change between extension and compression (and vice versa) is continuous, avoiding the "deadband" which inevitably occurs in dis-continuous systems.

The valve arrangement prevents re-circulation of actuator flow from one chamber of the actuator to the opposite chamber, because of the design of pressure reducing valves requiring them to control the downstream pressure in the actuator chamber by either supplying oil from the pump line or releasing oil to the tank.

Thus, when the actuator is in the resistive mode (it travels in the opposite direction to the load it exerts) the flow out of the chamber which is at the highest pressure is directed to tank whilst the flow which is required to fill in the chamber which is at the lowest pressure is taken from the pump which is at the highest pressure: energy is consumed within the system, showing the inefficiency of the valve arrangement.

In this arrangement, no flow divider valve is required. Hence pump flow is shared between a front and rear actuator as they require. The associated parasitic losses are also avoided.

In this arrangement the pressure controlled by the PCV is always greater or equal than the one which is regulated by the PRVs. In operating modes of the system where actuator load is changing, control strategies can be implemented to not decrease the PCV controlled pressure so that compliance of the "primary" circuit is not a limitation to the system response time. Further, this allows use of the "primary" circuit as an energy storage device.

SUMMARY OF THE INVENTION

The present invention provides a hydraulic suspension system comprising a source of regulated pressure, and pressure reducing means to regulate actuator chambers, wherein the system comprises a valve control means operable, in a resistive mode, to re-circulate actuator flow from one chamber to its opposite side.

In this way, a hydraulic suspension system of the present invention may ensure re-circulation of oil, for example circulation of oil from each pressure reducing valve exhaust port to the application port of the other pressure reducing valve, and ensure the pump supplies only the difference of the two piston areas as compared to the whole piston area.

The hydraulic suspension system of the present invention may include any one or more of the following features:—
- The regulated pressure source comprises a pump and a pressure control valve;
- The regulated pressure source comprises an electro-hydraulic pump with speed control to regulate the pump pressure;
- The source of regulated pressure comprises an energy storage device;
- A valve control means operable, in a resistive mode, to change spool position in dependence on pressure difference on sides on an actuator;
- An actuator pressure is monitored with a pilot conduit at each side of the spool;
- Check valve means operable to provide circulation of oil from a pressure reducing valve exhaust port to a pressure reducing valve application port;
- The regulated pressure source comprises one hydro-piloted valve;
- The regulated pressure source comprises two hydro-piloted valves;
- A hydro-piloted valve comprises integrated check valves;
- Each actuator chamber pressure is monitored with a pilot conduit at each side of the spool.

The present invention also provides a method of operating a hydraulic suspension system comprising a source of regulated pressure, the method comprising regulating actuator pressures and, in a resistive mode, re-circulating actuator flow from one chamber to its opposite side.

The method of the present invention also may include any one or more of the following features:—
  Regulating the pressure source comprises operating a pump and a pressure control valve;
  Regulating the pressure source comprises operating an electro-hydraulic pump with speed control to regulate the pump pressure;
  Regulating the pressure source comprises operating an energy storage device.
  In a resistive mode, changing spool position in dependence on pressure difference on sides on an actuator;
  Monitoring an actuator pressure with a pilot conduit at each side of the spool;
  Check valve means circulating oil from a pressure reducing valve exhaust port to a pressure reducing valve application port;
  Regulating the pressure source comprises operating a hydro-piloted valve;
  Regulating the pressure source comprises operating two hydro-piloted valves;
  A hydro-piloted valve comprises integrated check valves;
  In a resistive mode, changing spool position in dependence on pressure difference on sides on an actuator.

APPLICATIONS OF THE PRESENT INVENTION

The present invention is applicable to hydraulic suspension systems for a wide variety of vehicles, especially to electrically-powered vehicles and hybrid electric/gasoline vehicles, primarily automobiles, saloons, pick-up trucks, vans and small commercial vehicles.

Advantages of the Present Invention

The present invention may provide any one or more of the following features:
  A continuous suspension system with re-circulation of oil in the resistive mode;
  A reduced energy consumption during non-motoring modes;
  A smaller capacity pump can be used, with the ensuing further benefits of reduced weight, cost, fuel consumption and $CO_2$ expenditure;
  An electro-hydraulic pump may be used instead of an engine-driven pump, with the ensuing benefits of being powered by a 12 Volt vehicle-electrical system, and independence from the engine (allowing the system to operate in all conditions), and increased flexibility for installation in a vehicle (avoiding integration issues for OEMs), and providing energy to the system in all modes, and reduced weight, cost, fuel consumption and $CO_2$ expenditure;
  Energy during non-motoring modes (e.g. handling manouevres and road disturbances) may be stored in an attenuator or accumulator.

BRIEF DESCRIPTION OF THE DRAWINGS

In order that the invention may more readily understood, a description is now given, by way of example only, reference being made to various embodiments of the present invention, in which.

DETAILED DESCRIPTION OF THE DRAWINGS

Figure 1A:
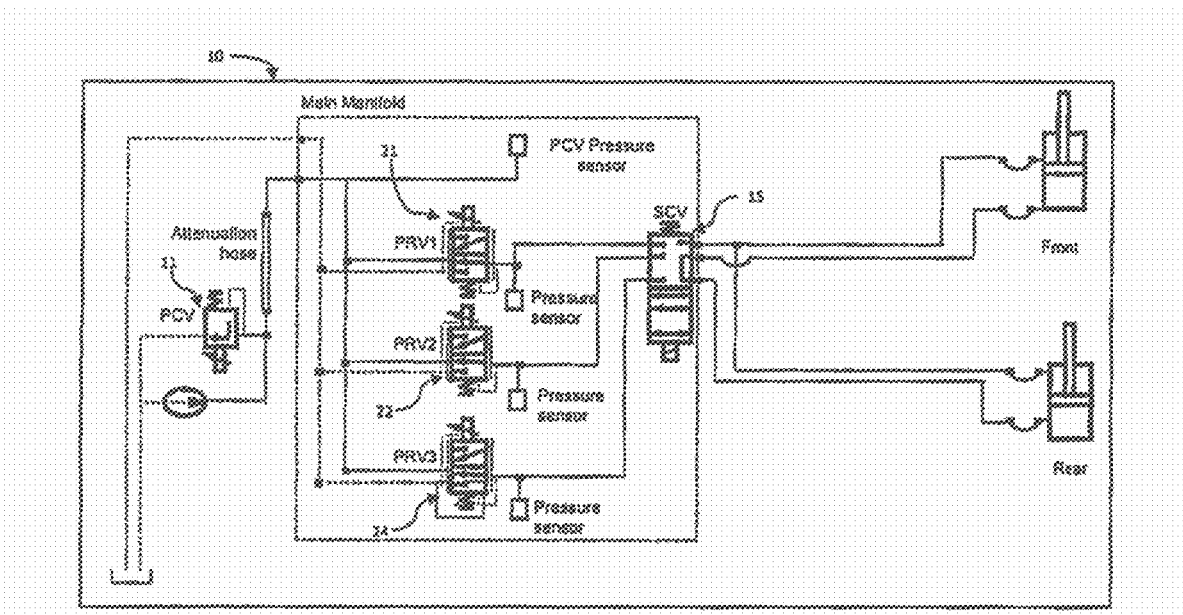
—
  FIG. 1A is a circuit diagram of a valve arrangement in a conventional, continuous hydraulic suspension system.

There is shown in FIG. 1A, a conventional valve configuration of a continuous hydraulic suspension system 10 in which a pressure control valve 11 regulates the pump pressure. Additional proportional Pressure Reducing Valves 21, 22 and 24 regulate the actuator chamber pressures. In this way, load can be changed in the actuators without introducing any flow/pressure discontinuity.

In normal system operation, a Safety Control Valve 15 connects the Pressure Reducing Valves controlled pressures to their respective actuator chambers. In case of system failure, this two position directional control valve is de-energized, hence actuator chambers are isolated from the controlled pressures. This Safety Control Valve could take different form depending on the desired failure mode and is not in the scope of the present invention.

Because all actuator chambers are controlled, the load change between extension and compression (and vice versa) is continuous, with no dead-band phenomena which are problems associated with dis-continuous systems.

For a given controlled load, different "pairs" of rod and piston pressures can be used. For example, and considering an equal area actuator for sake of simplicity, the same load will be generated with 1) 100 bar on rod side, and 10 bar on piston side, as with 2) 150 bar on rod side, and 60 bar on piston side. This can help avoiding cavitation in the system. It can also be used to increase the system bandwidth.

In this valve architecture, the pressure controlled at the pump is "half independent" from the pressure controlled in the actuators by the PRVs: i.e. the PRV controlled pressures are always less than the one controlled by the PCV. This means that the pump/PCV pressure can be controlled higher than what is required for the actuators/PRVs. This provides the opportunity to enhance the system response time/bandwidth by storing energy in the attenuation hose (and/or an additional accumulator) during the phase where actuators are not consuming the full pump flow.

For example, during a load change from one direction to the other, the pump pressure can be kept constant, avoiding consuming flow in the attenuation hose due to changes in pressure. Another example is when the vehicle is driven in a straight line, followed by a rapid change in direction: the steering wheel angle can be used as a preview to start building pressure into the system with the PCV, even if no load is yet required from the actuators, controlled by the PRVs.

Figure 1B:
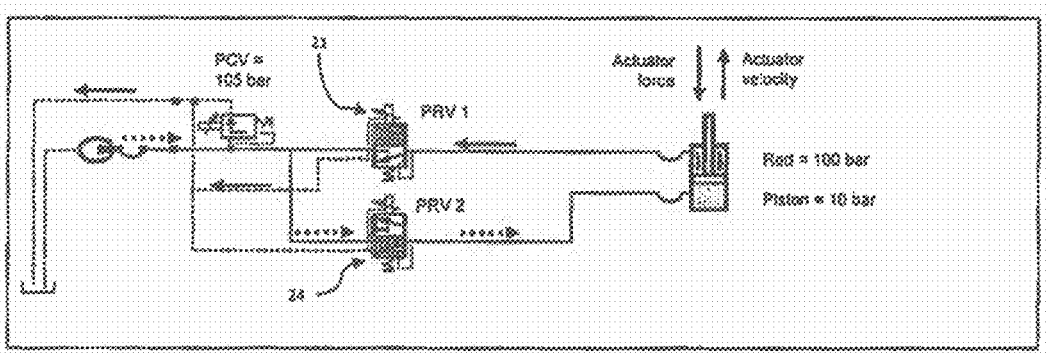
FIG. 1B shows the valve arrangement of FIG. 1A in the resistive operating mode.

FIG. 1B illustrates the main drawback of the continuous system 10 of FIG. 1A, but only in respect of one axle and with no Safety Control Valve for sake of simplicity. Because of the valve arrangement, actuator flow cannot be re-circulated from one chamber of an actuator to its opposite side. Thus, when the system is in a "resistive mode", i.e. the input on the actuator tends to displace the actuator in the opposite direction of the exerted actuator load, the system will consume energy. In the above example, the rod chamber oil, at high pressure, is released to tank and the piston chamber, at low pressure, is filled in using high pressure coming from the pump. Hence, although energy is taken out of the actuator, energy is consumed by the system.

Figure 1C:
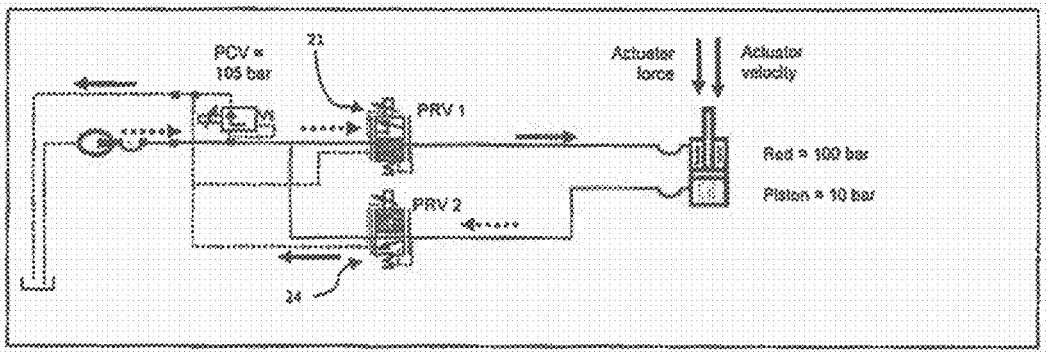
FIG. 1C shows the valve arrangement of FIG. 1A in the motoring operating mode.

FIG. 1C illustrates the continuous system 10 of FIG. 1A when the system is in a "motoring mode", i.e. the input on the actuator tends to displace the actuator in the same direction of the exerted actuator load.

Figure 2A:
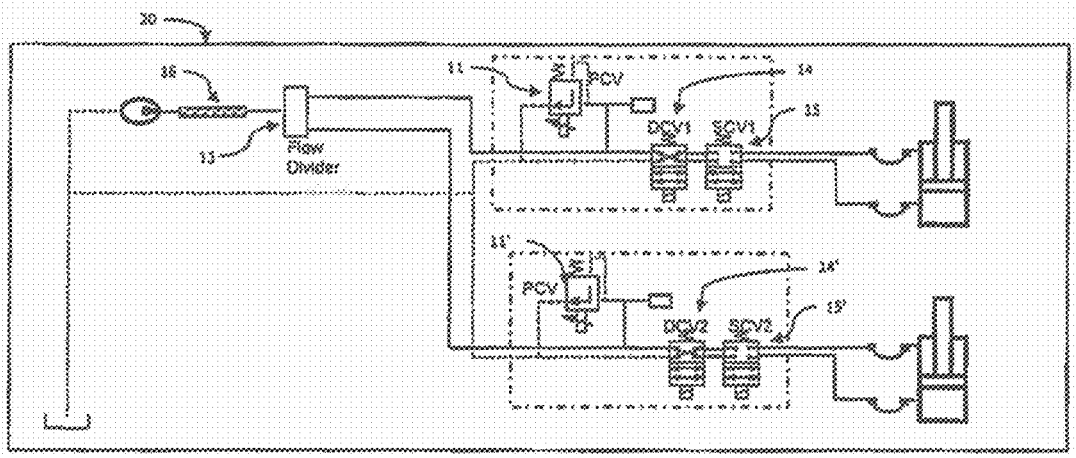
FIG. 2A is a circuit diagram of a valve arrangement in a conventional, dis-continuous hydraulic suspension system.

There is shown in FIG. 2A, a conventional valve configuration of a dis-continuous hydraulic suspension system 20 in which a flow divider splits the pump flow between the front and rear circuit. Pressure control valves 11 and 11' regulate a front and rear pressure. Directional Control Valves 14 and 14' are operated to connect the respective front and rear controlled pressure to either the rod chambers or piston chambers based on desired load direction, while the opposite chambers are connected to tank. As in system 10, Safety Control Valves 15 and 15' can be added to enhance failure mode.

In order to change the load direction between extension and compression (and vice versa), the Directional Control Valves 14 and 14' have to be switched between their two possible positions. This will create discontinuities in the loads exerted by the actuators. It will also generate both pressure and flow discontinuities, hence possible noise in the system. To minimize those discontinuities, Directional Control Valves have to change position when the difference between the controlled pressures and the tank pressure is minimal. This will inevitably impose special care in the way that the Pressure Control Valves and Directional Valves are synchronized when a change in load direction is required. The minimum difference between the controlled pressures and the tank pressure will also affect the minimum actuator load which can be controlled; hence a dead-band in which the actuator loads cannot be controlled.

With this architecture, the pressure in the primary circuit, i.e. upfront the flow divider, is equal to the maximum of the two controlled pressures plus some parasitic pressure drops through the flow divider itself. Therefore when the system requires fast change in controlled load direction and amplitude, the primary circuit pressure will change rapidly. These changes in primary circuit pressure will result in flows being absorbed and released by the primary circuit compliance (typically the attenuator hose 16 implemented to minimize the noise coming from the pump pressure pulses). When pump flow is absorbed by the primary circuit compliance, it results in less flow available to change actuator chamber volume, hence limitations for changing the load exerted by the actuators, hence limited system bandwidth.

Figure 2B:
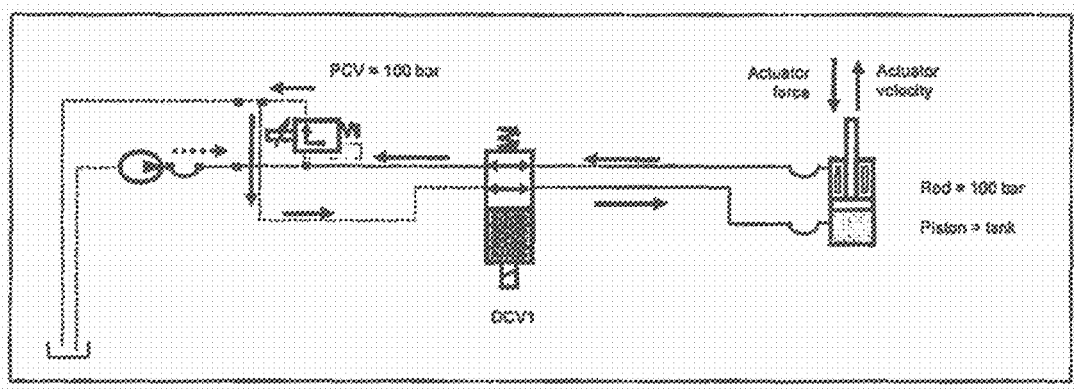
FIG. 2B shows the valve arrangement of FIG. 2A in the resistive operating mode.
Figure 2C:
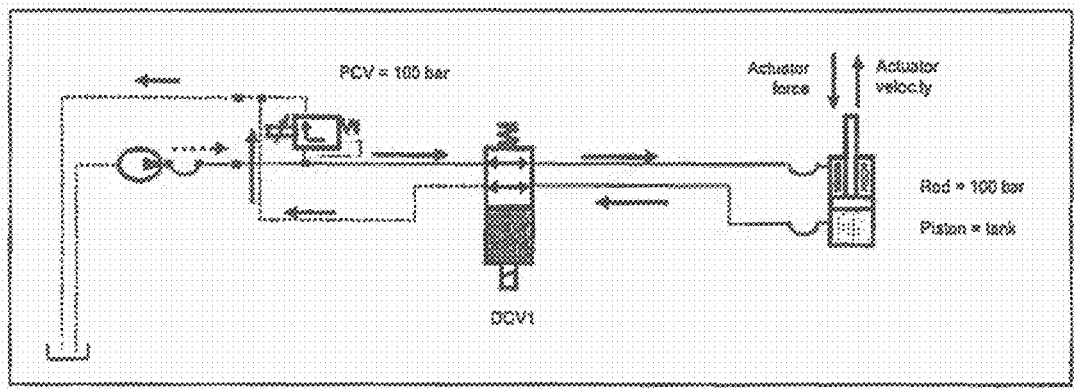
FIG. 2C shows the valve arrangement of FIG. 2A in the motoring operating mode.

FIG. 2B illustrates the main advantage of the continuous system 20 of FIG. 2A, but only in respect of one axle and with no Safety Control Valve for sake of simplicity. Because of the valve arrangement, actuator flow can be re-circulated from one chamber of an actuator to its opposite side. Thus, when the system is in a "resistive mode", i.e. the input on the actuator tends to displace the actuator in the opposite direction of the exerted actuator load. If the pump is a constant displacement pump, the system still consumes energy. In the above example, the rod chamber oil, at high pressure, is released to tank. Because the piston chamber is connected to tank, oil is effectively re-circulated from the rod chamber to the piston chamber.

FIG. 1C illustrates the dis-continuous system 20 of FIG. 2A when the system is in a "motoring mode", i.e. the input on the actuator tends to displace the actuator in the same direction of the exerted actuator load.

Figure 3A:
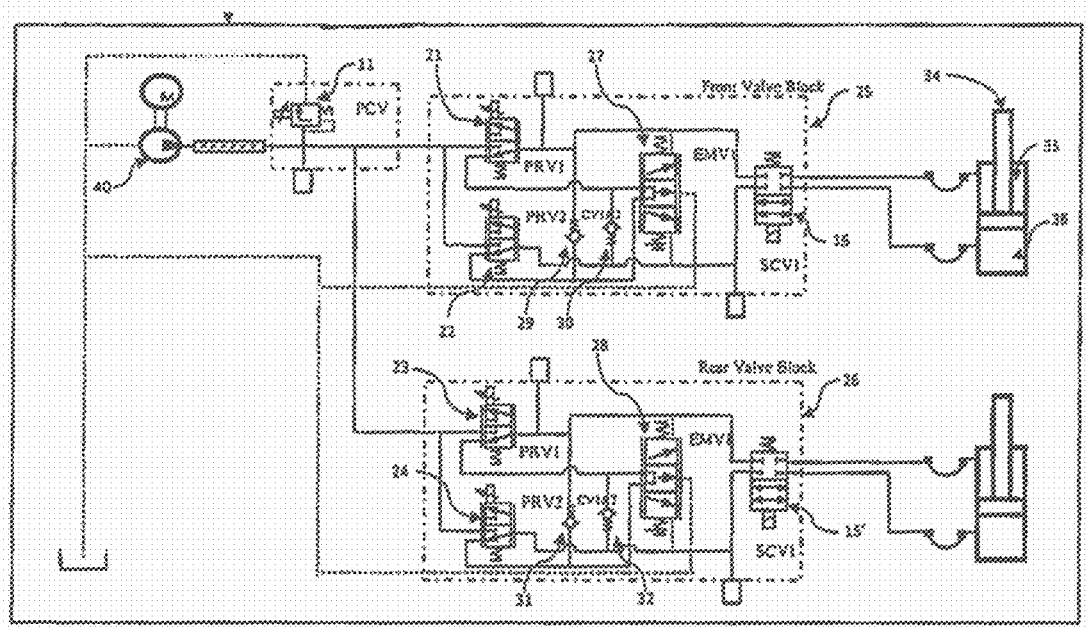
FIG. 3A is a circuit diagram of a valve arrangement in a hydraulic suspension system of a first embodiment of the present invention.

There is shown in FIG. 3A a first embodiment of the present invention, being a continuous hydraulic suspension system 30, which has a number of similarities with the continuous system 10 of FIG. 1A, retaining the use of PRVs pressure reducing valves, PRVs 21, 22, 23, 24, to control actuator chambers. As in system 10, Safety Control Valves 15 and 15' can be added to enhance failure mode.

However, a distinction of system 30 over prior art system 10 is in having, in each front and rear valve block 25, 26 some additional valves, being namely:
  Energy Management Valves (EMV) 27, 28 (1 front/1 rear);
  Check Valves (CV) 29, 30, 31, 32 (2 front, 2 rear).

The EMV valves 27, 28 incorporate a spool 33 which changes position based on the pressure difference between the 2 opposite chambers of each actuator 34. Each actuator pressure is "sensed" using a pilot conduit connected to each side of the spool. The CV check valves 29 to 32 allow circulation of oil from each PRV exhaust port to the conduit of its opposite actuator chamber.

Figure 3B:
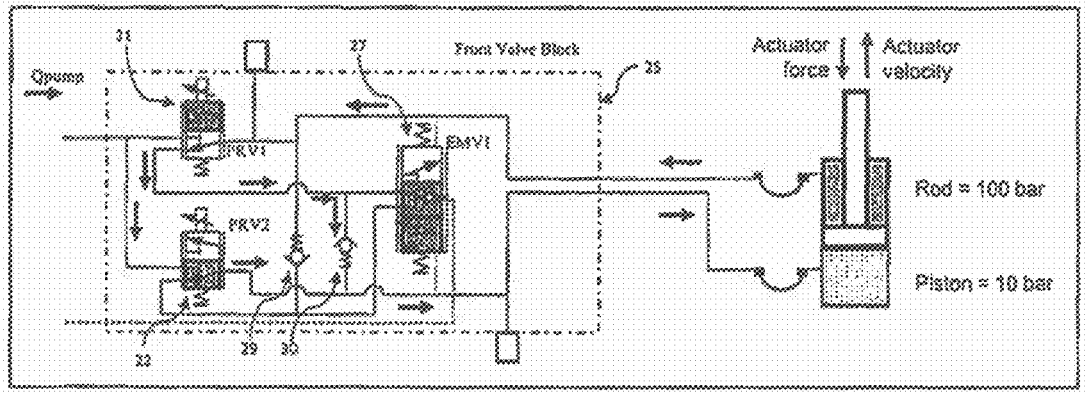
FIG. 3B shows the valve arrangement of FIG. 3A in the resistive operating mode.
Figure 3C:
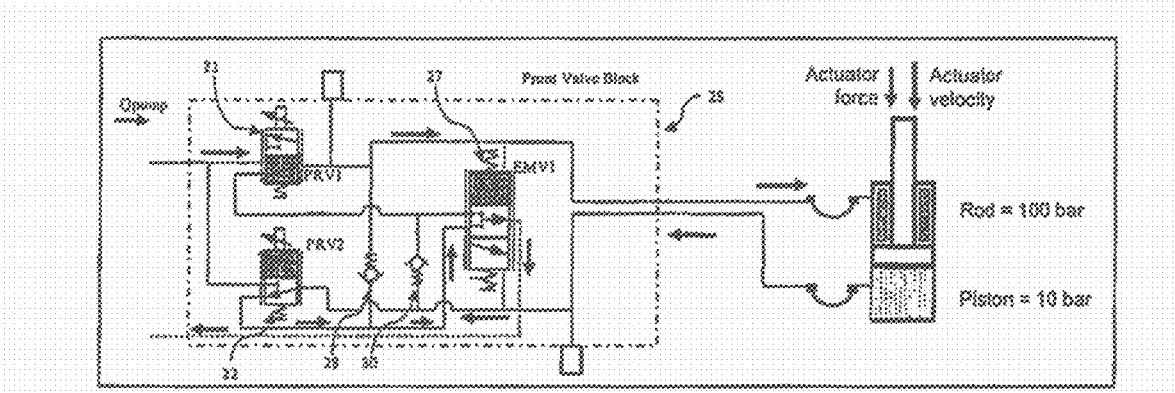
FIG. 3C shows the valve arrangement of FIG. 3A in the motoring operating mode.

FIGS. 3B and 3C illustrate the different operating modes of system 30, but only in respect of one axle and with no Safety Control Valve for sake of simplicity.

In the case of the resistive mode of work, namely when the force and velocity of the actuator are in opposite directions, the system 30 operates as shown in FIG. 3B. Because the rod chamber pressure is greater than the piston chamber pressure, the EMV spool is moved, thanks to its pilot conduits, such that the exhaust port of PRV 21 is closed. Hence oil expelled by the actuator rod chamber through PRV 21 will flow through check valve 30 into the actuator piston chamber.

Therefore the pump 40 has to supply only the difference of the two 2 areas (in system 10, the pump had to supply the whole piston area).

Figure 4A:
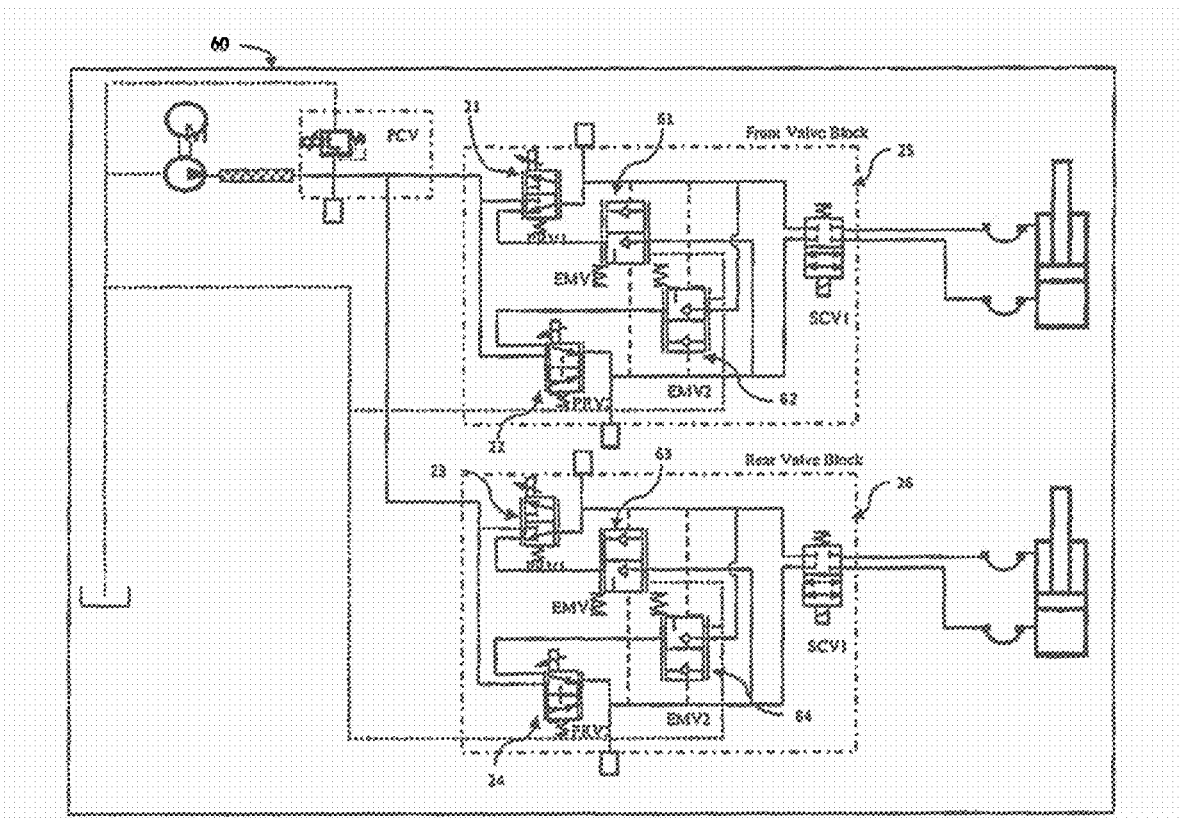
FIG. 4A is a circuit diagram of a valve arrangement in a hydraulic suspension system of a second embodiment of the present invention.

In the case of the motoring mode of work, namely when the force and velocity of the actuator are in the same direction, the system 30 operates as shown in FIG. 4A.

Because the rod chamber pressure is greater than the piston chamber pressure, the EMV spool is moved, thanks to its pilot conduits, such that the exhaust port of PRV 21 is closed. Hence oil expelled by the actuator piston chamber through PRV 22 will flow to tank through the EMV 27. Therefore the pump has to supply the rod chamber area (no difference as compared to prior art system 10 of FIG. 1A, likewise also the conventional dis-continuous arrangement).

FIGS. 3D, 3E and FIGS. 3F, 3G show in greater detail the valves of system 30 in some operating positions.

Figure 3D:
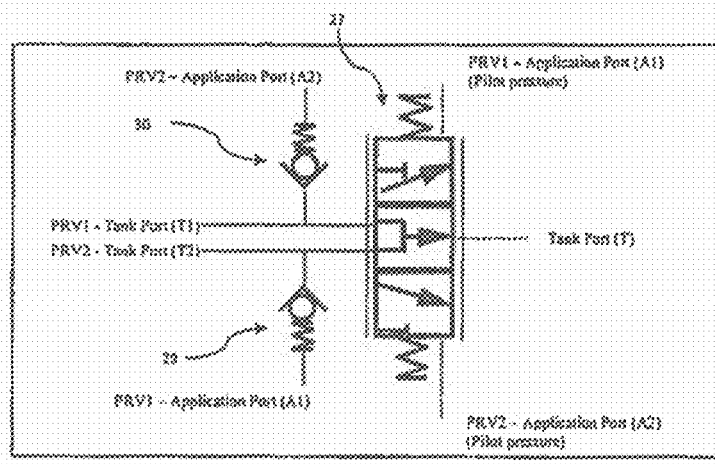
FIGS. 3D and 3E show details of the valve arrangement of FIG. 3A in the middle position.
Figure 3E:
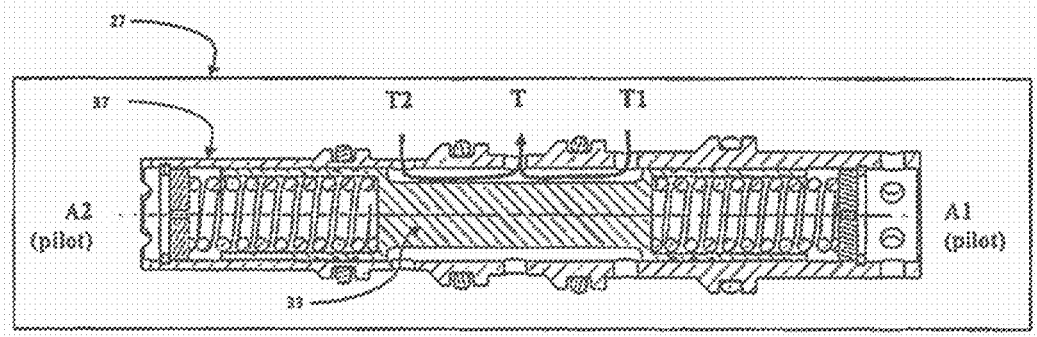

Thus, FIGS. 3D and 3E show EMV1 valve 27 in the middle position such that:
When the two sides of the actuators are at a similar pressure (A1≈A2);
The spool 33 is centered in the sleeve 37, and the tank ports of the 2 PRVs are connected to tank
Both check valves are closed (FIG. 3E not showing the check valves).

Figure 3F:
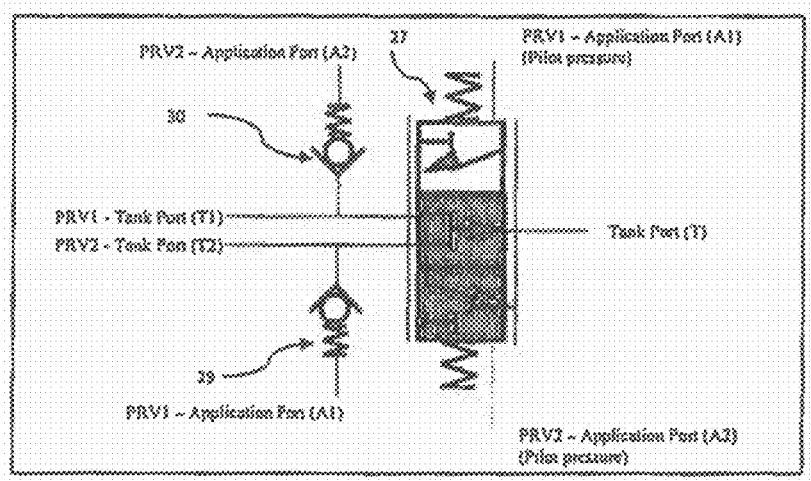
FIGS. 3F and 3G show details of the valve arrangement of FIG. 3A in the "rod pressure greater than piston pressure" mode.
Figure 3G:
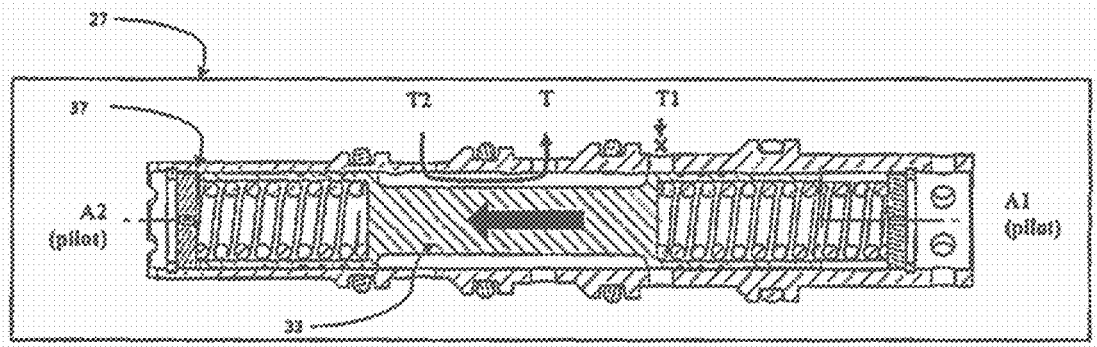

FIGS. 3F and 3G show EMV1 valve in the mode wherein "Rod pressure greater than piston pressure: A1>A2" such that:
The spool is moved such that Tank port of PRV1 is closed (T1);
If PRV1 has to release fluid (A1 connected to T1), the only way is through the check valve; PRV1 will therefore release fluid into A2 instead of Tank (again FIG. 3E does not show check valves).

FIG. 4A shows a second embodiment of the present invention, being a continuous hydraulic suspension system 60 which operates in a generally similar manner to that of system 30, except that the re-circulation function is now split into two hydro-piloted valves EMV1 valve 61, 62 and 63, 64 with integral check valves; the other valves are essentially the same as in system 30 the previous embodiment and are given the same reference numerals.

Figure 4B:
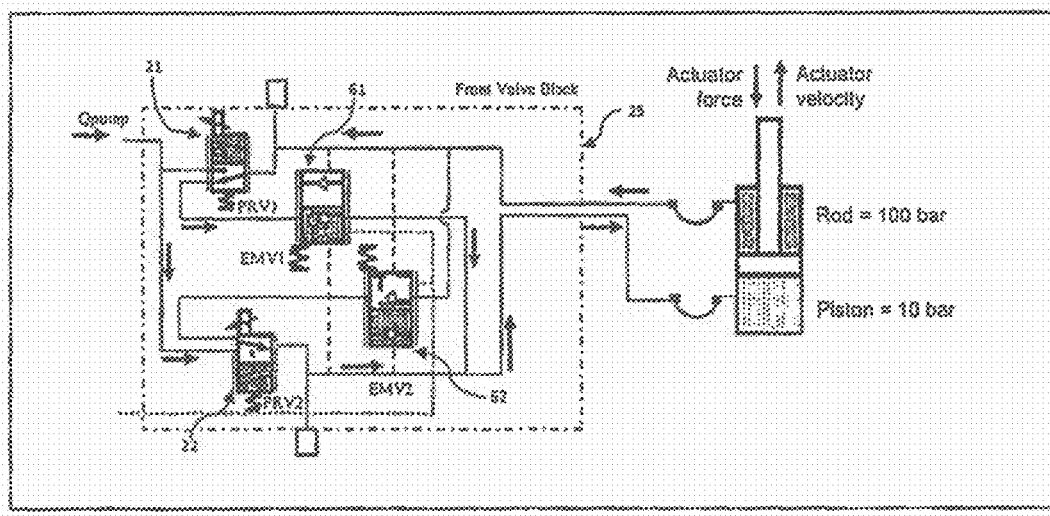
FIG. 4B shows the valve arrangement of FIG. 4A in the resistive operating mode.
Figure 4C:
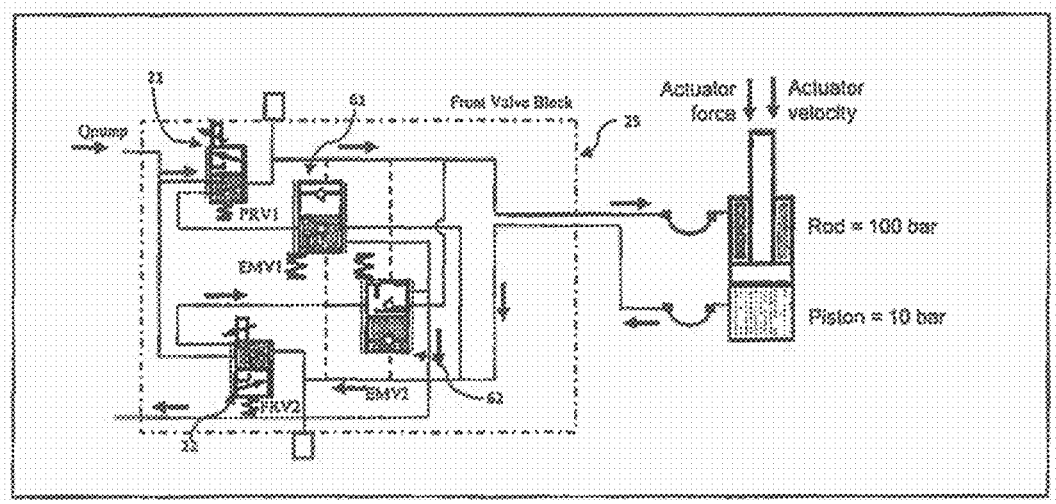
FIG. 4C shows the valve arrangement of FIG. 4A in the motoring operating mode.

FIGS. 4B and 4C show the different operating modes of this valve arrangement, relating only to one axle for sake of simplicity.

For the resistive mode, the valve arrangement of system 60 operates as shown in FIG. 4B, with equivalent flow paths and supply requirements and results as in FIG. 3B. For the motoring mode, the valve arrangement of system 60 operates as shown in FIG. 4C, with equivalent flow paths and supply requirements as in FIG. 3C.

FIGS. 4D, 4E and 4F, 4G show in greater detail the valves of system 60 in some operating positions.

Figure 4D:
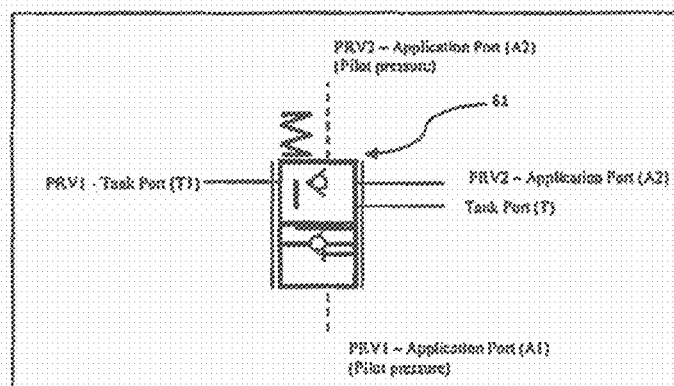
FIGS. 4D and 4E show details of the valve arrangement of FIG. 4A in the middle position.
Figure 4E:
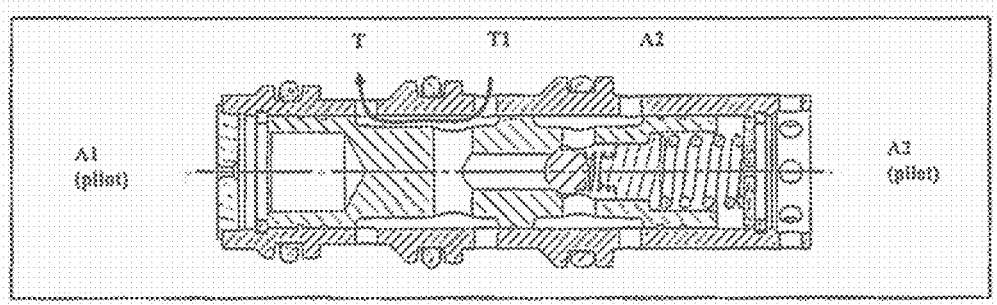

Thus FIGS. 4D, 4E show EMV1 valve 61 in the rest position such that:
When the two sides of the actuators are at a similar pressure (A1≈A2 or A2 greater than A1);
The spool is preloaded so that tank of PRV1 is connected to the return line to tank
Each check valve is now incorporated in each EMV.

Figure 4F:
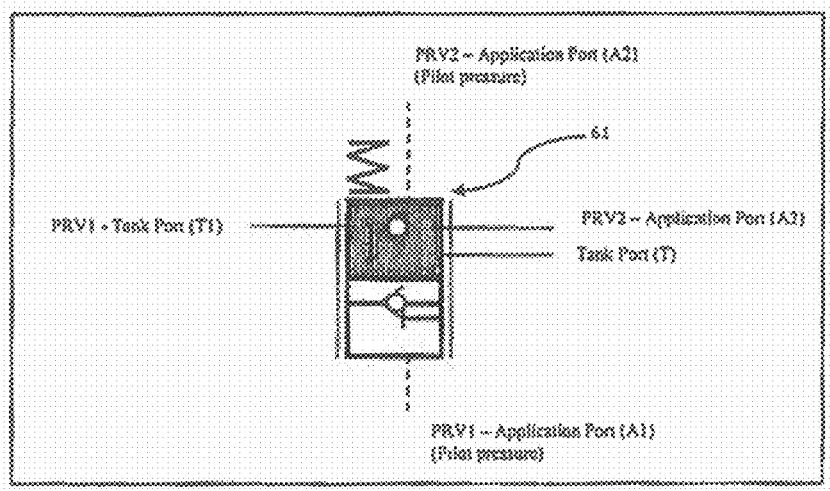
FIGS. 4F and 4G show details of the valve arrangement of FIG. 4A in the "rod pressure greater than piston pressure" mode.
Figure 4G:
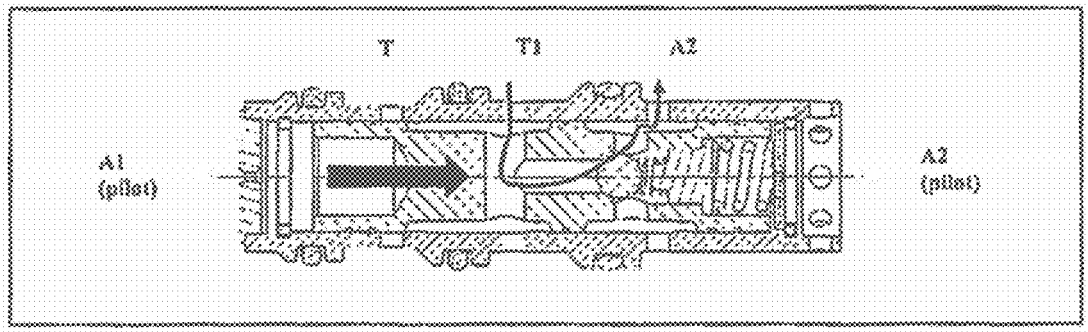

FIGS. 4F, 4G show EMV1 valve 61 in the "Rod pressure greater than piston pressure: A1>A2" such that:

The spool is moved such that exhaust port of PRV1 is no longer connected to the tank line;
If PRV1 has to release fluid (A1 connected to T1), the only way is through the check valve; PRV1 will therefore release fluid into A2 instead of Tank.

Figure 5A:
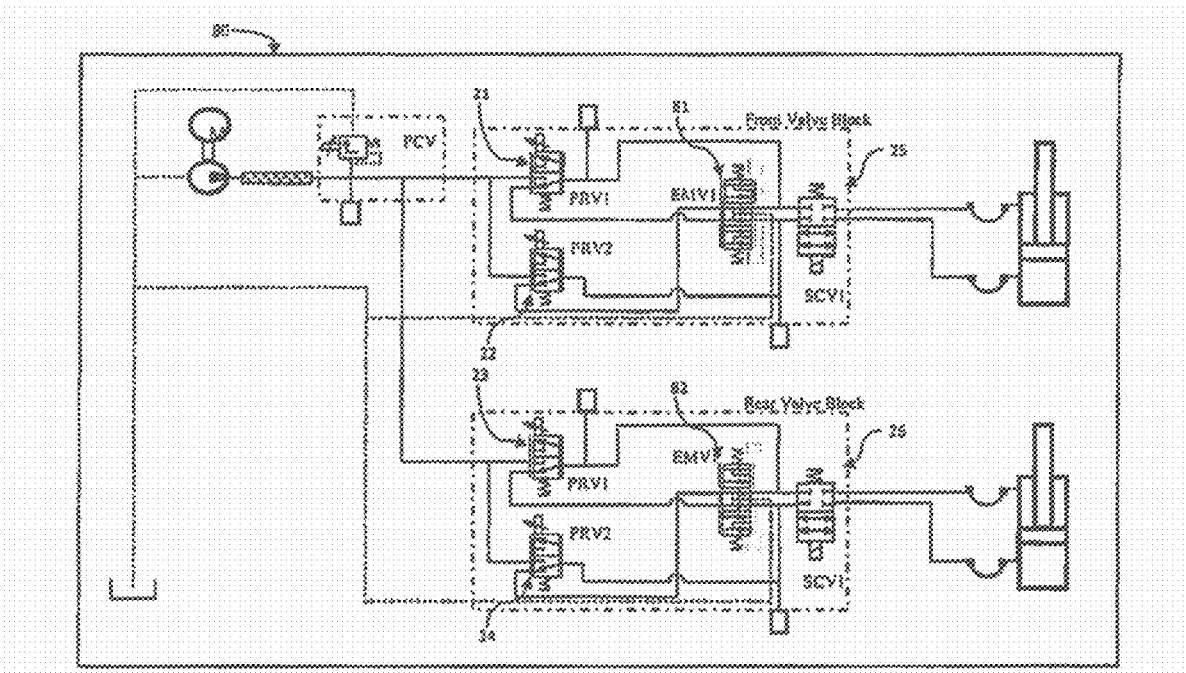
FIG. 5A is a circuit diagram of a valve arrangement in a hydraulic suspension system of a third embodiment of the present invention.

FIG. 5A shows a third embodiment of the present invention, being a continuous hydraulic suspension system 80 which operates in a generally similar manner to that of system 30, except that the single EMV1 valve 81, 82 has two integrated check valves.

Figure 5B:
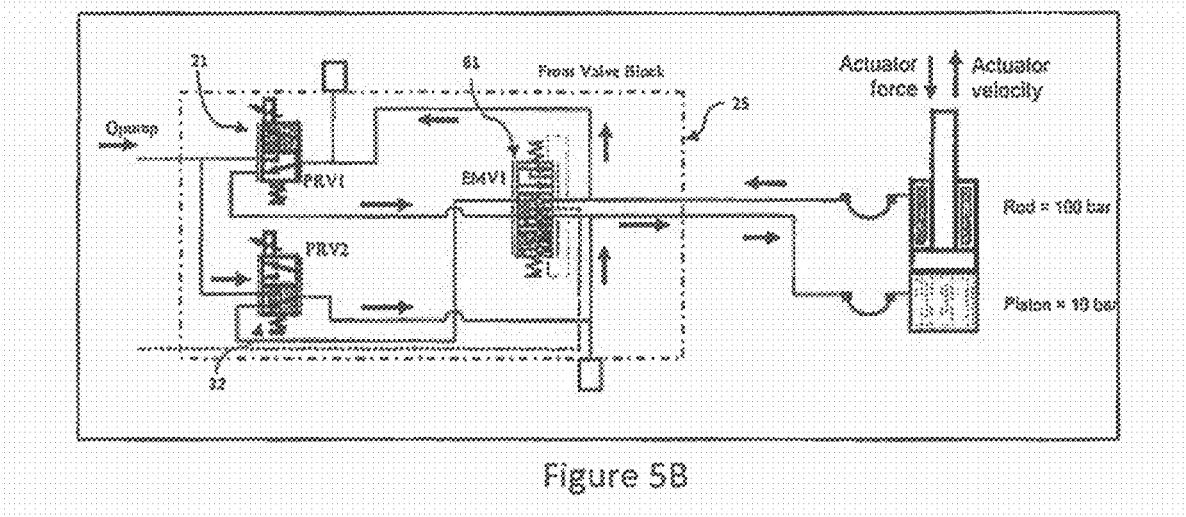
FIG. 5B shows the valve arrangement of FIG. 5A in the resistive operating mode.
Figure 5C:
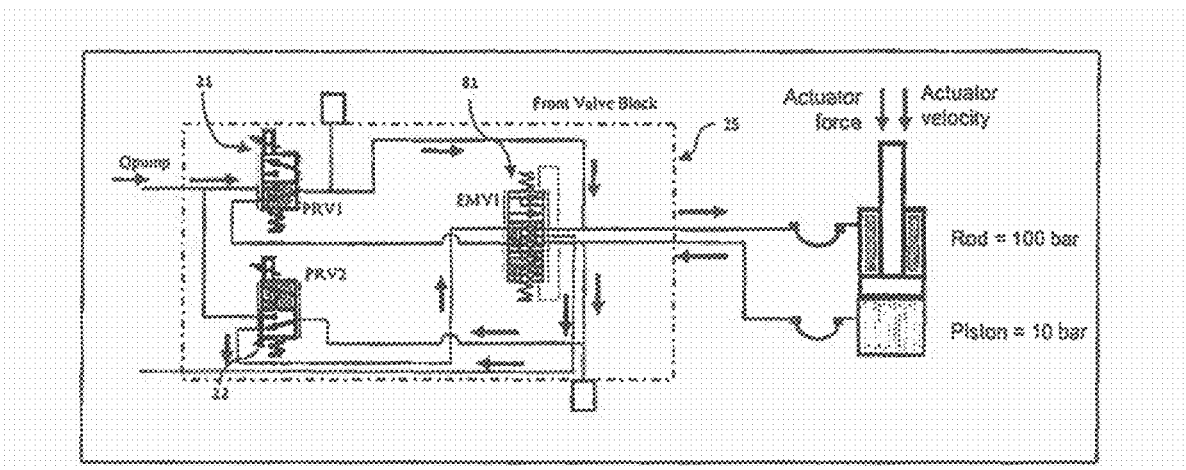
FIG. 5C shows the valve arrangement of FIG. 5A in the motoring operating mode.

FIGS. 5B and 5C show the different operating modes of this valve arrangement, relating only to one axle for sake of simplicity.

For the resistive mode, the valve arrangement of system 80 operates as shown in FIG. 5B, with equivalent flow paths and supply requirements and results as in FIG. 3B. For the motoring mode, the valve arrangement of system 80 operates as shown in FIG. 5C, with equivalent flow paths and supply requirements and results as in FIG. 3C.

FIGS. 5D, 5E and 5F, 5G show in greater detail the valves of system 80 in some operating positions.

Figure 5D:
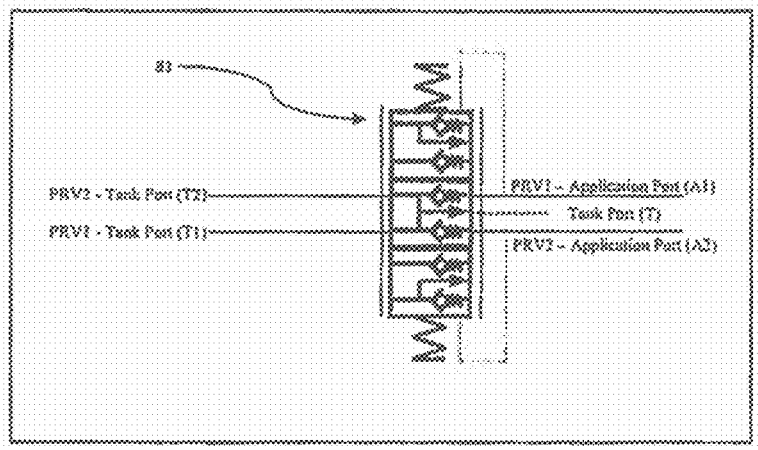
FIGS. 5D and 5E show details of the valve arrangement of FIG. 5A in the middle position.
Figure 5E:
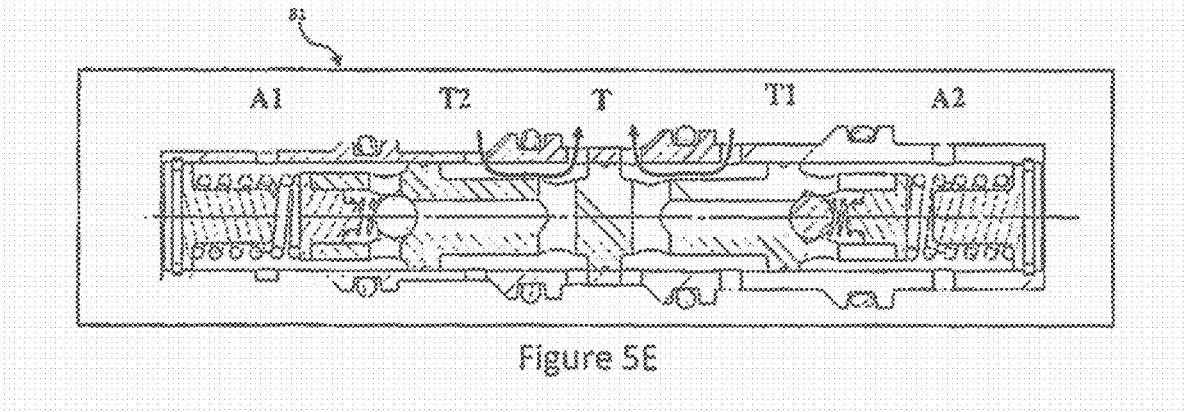

Thus, in similar manner as the earlier embodiments of the present invention, FIGS. 5D, 5E show EMV1 valve 81 in the rest position such that:
When the two sides of the actuators are at a similar pressure (A1≈A2);
The spool is preloaded so that tank of PRV is connected to the return line to tank
Each check valve is now incorporated in each EMV.

Figure 5F:
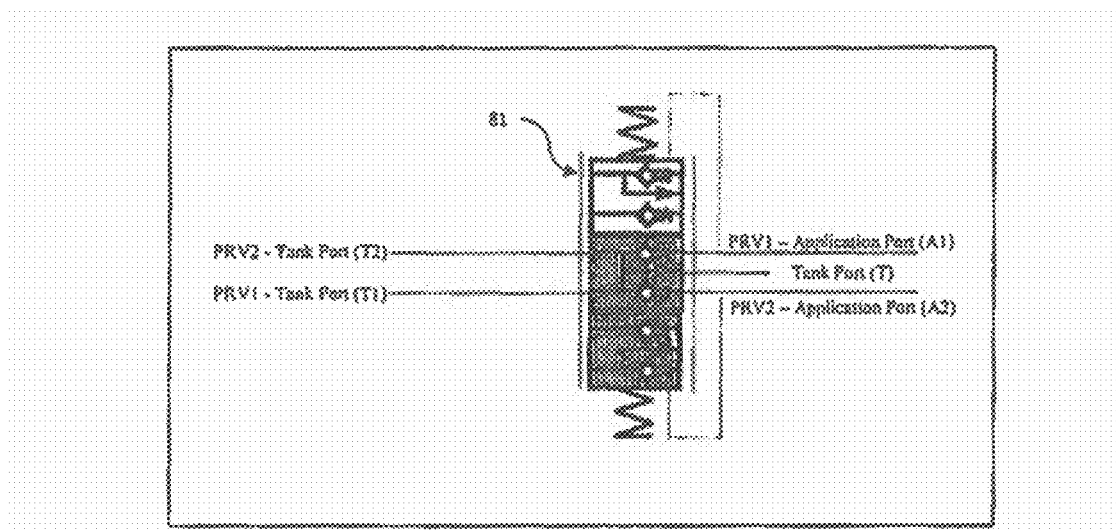
FIGS. 5F and 5G show details of the valve arrangement of FIG. 5A in the "rod pressure greater than piston pressure" mode.
Figure 5G:
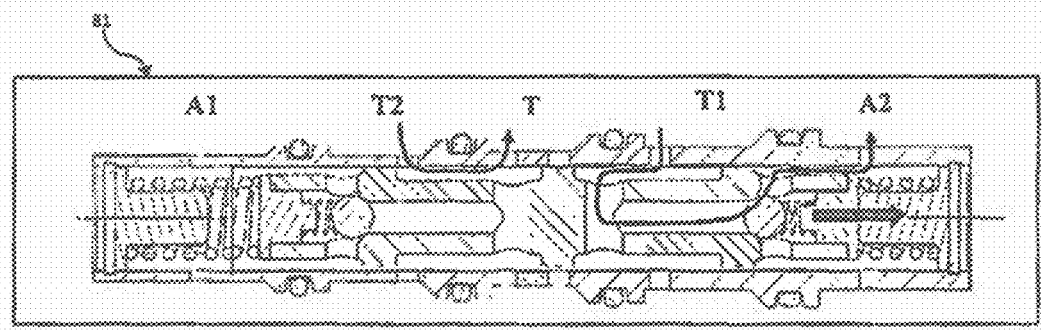

Also, in similar manner as the earlier embodiments of the present invention, FIGS. 5F, 5G show EMV1 valve 81 in the "Rod pressure greater than piston pressure: A1>A2" such that:
The spool is moved such that the exhaust port of the PRV controlling the rod chamber is no longer connected to the tank line;
If PRV1 has to release fluid (A1 connected to T1), the only way is through the check valve; PRV1 will therefore release fluid into A2 instead of Tank.

Figure 6A:
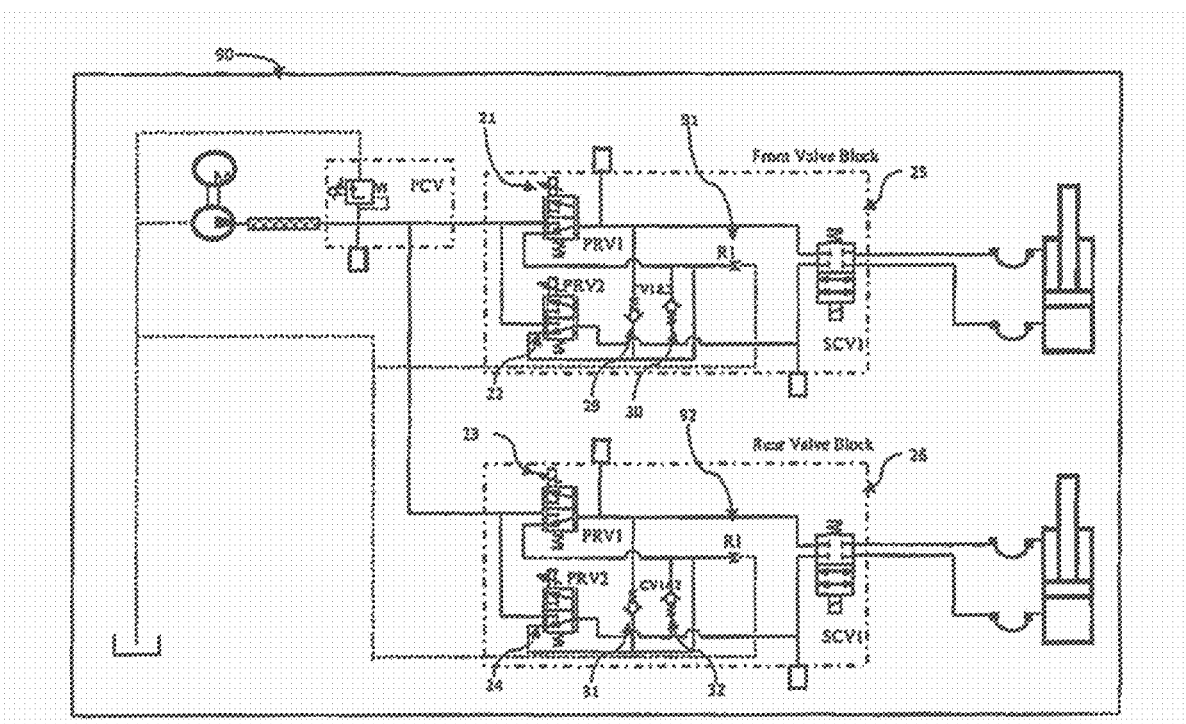
FIG. 6A is a circuit diagram of a valve arrangement in a hydraulic suspension system of a fourth embodiment of the present invention.

There is shown in FIG. 6A a fourth embodiment of the present invention, being a continuous hydraulic suspension system 90, which has a number of similarities with the continuous system 10 of FIG. 1A, retaining the use of PRVs pressure reducing valves, PRVs 21, 22, 23, 24, to control actuator chambers.

However, a distinction of system 90 over prior art system 10 is in having, in each front and rear valve block 25, 26 some additional valves, being namely:
Restrictions 91, 92 (1 front, 1 rear)
Check Valves (CV) 29, 30, 31, 32 (2 front, 2 rear).

The restrictions 91, 92 are generating pressure drops as a function of flow exhausted by the pressure reducing valves, hence increasing the pressure levels at the tank port of the pressure reducing valves.

The CV check valves 93 to 96 allow circulation of oil from each PRV exhaust port to the application port of the other PRV.

Figure 6B:
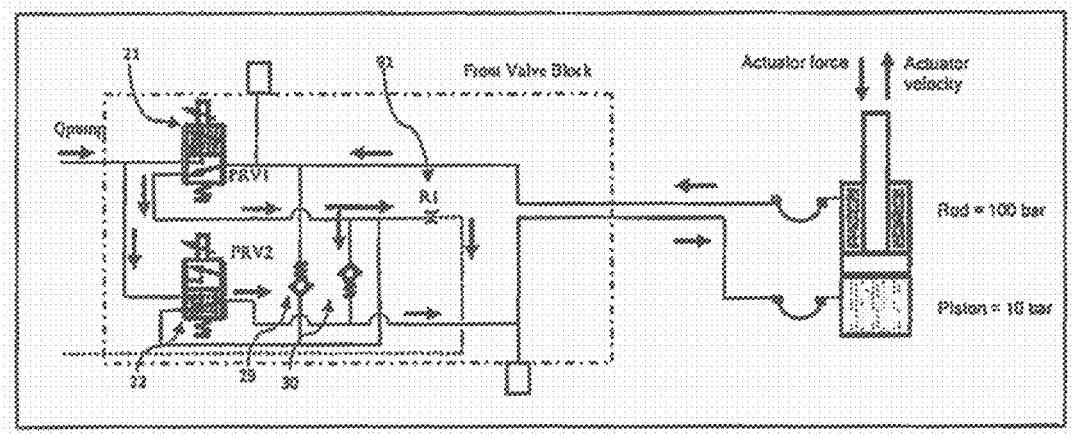
FIG. 6B shows the valve arrangement of FIG. 6A in the resistive operating mode.
Figure 6C:
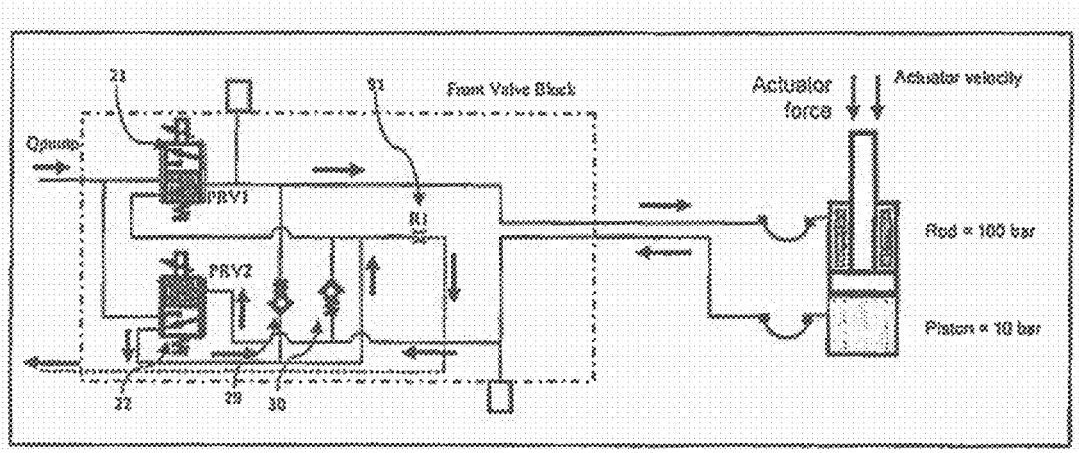
FIG. 6C shows the valve arrangement of FIG. 6A in the motoring operating mode.

FIGS. 6B and 6C illustrate the different operating modes of system 90, but only in respect of one axle for sake of simplicity.

In the case of the resistive mode of work, namely when the force and velocity of the actuator are in opposite directions, the system 90 operates as shown in FIG. 6B.

With this embodiment, a certain level of exhausted flow will be necessary before re-circulation can occurs: the combination of flow level and pressure drop in the restriction has to create a pressure greater than the low pressure actuator chamber before flow can occur through the check valve. Amount of flow which is re-circulated will depend the ratio between the flow through the check valve and the flow through the restriction. This ratio will depend on:

The pressure levels in the actuator chambers;

The ratio of the pressure drops through the check valve and the restriction;

Therefore the pump 40 has to supply only a fraction of the expanding chamber volume (in system 10, the pump had to supply the whole piston chamber volume).

In the case of the motoring mode of work, namely when the force and velocity of the actuator are in the same direction, the system 90 operates as shown in FIG. 6C.

The pump has to supply the rod chamber area (no difference as compared to prior art system 10 of FIG. 1A, likewise also the conventional dis-continuous arrangement).

There can be different combinations for the "primary" circuit. The function of the primary circuit is to provide a source of pressure and flow to the "secondary" circuit, i.e. the circuit controlling the actuator pressures. This primary circuit can take various different forms:

1. Pump (engine driven or Electro-Hydraulic pump (EH pump))+attenuator and/or accumulator+PCV 2. Electro-hydraulic pump which speed is controlled to control the primary circuit pressure+attenuator and/or accumulator. No PCV.

3. Pump (engine driven or EH-pump)+attenuator and/or accumulator+some other sorts of valve controlling the primary circuit pressure.

Thus each of systems 20, 60 and 80 have a continuous valve architecture with re-circulation of oil during resistive mode, and this allows downsizing of the pump. Also it maintains certain advantages of the previous continuous architecture, being:

no dead-band nor discontinuity;

Independence of pump/attenuator controlled pressure vs actuator controlled pressure.

In the present invention, by use of the EMV valve, re-circulation during non-motoring events is now allowed. This is true for both handling maneuvers and also for road inputs. This allows storage of energy in the attenuator and/or an additional accumulator during non-motoring modes.

The present invention enables downsizing of the energy source in the system. As a smaller pump can be used, this results in reducing weight, cost, fuel consumption and CO2 emissions.

Furthermore, an electric motor-driven pump or an electro-hydraulic pump running from a 12 Volt vehicle electrical system may be used in the present invention. Current production requires an engine driven pump, which causes integration issues to OEM (a pump has to be packaged for different engine versions).

However, as now with the present invention, it is possible to use an electric motor-driven pump or an electro-hydraulic pump, this offers increased flexibility for installation in the vehicle. Using an electric motor-driven pump or an electro-hydraulic pump may lead to further reduction in cost, fuel consumption and CO2 emissions.

In the case of hybrid vehicles, problems with prior art systems are even worse as the internal combustion engine is not running while the vehicle is cornering. Hence an engine driven pump would not supply energy to the system. As the electro-hydraulic pump is independent from the engine, a system of the present invention may operate in all conditions.

What is claimed is:

1. A hydraulic suspension system comprising:
    a source of regulated pressure;
    an actuator having a rod chamber and a piston chamber;
    a first pressure reducing valve fluidly connected to said source of regulated pressure and said rod chamber of said actuator;
    a first intermediate conduit fluidly connected to and disposed between said first pressure reducing valve and said piston chamber of said actuator;
    wherein said first pressure reducing valve is moveable between a first position and a second position, wherein fluid is able to pass though said first pressure reducing valve from said rod chamber to said first intermediate conduit, and said fluid is unable to pass though said first pressure reducing valve from said source of regulated pressure when said first pressure reducing valve is in said first positon, and wherein said fluid is unable to pass through said first pressure reducing valve from said rod chamber to said first intermediate conduit, and able to pass from said source of regulated pressure through said first pressure reducing valve when said first pressure reducing valve is in said second position;
    a first check valve disposed along said first intermediate conduit allowing said fluid to pass from said first pressure reducing valve to said rod chamber and preventing said fluid from passing from said rod chamber to said first pressure reducing valve;
    a second pressure reducing valve fluidly connected to said source of regulated pressure and said piston chamber of said actuator;
    a second intermediate conduit fluidly connected to and disposed between second pressure reducing valve and said rod chamber of said actuator;
    wherein said second pressure reducing valve is moveable between a first position and a second position, wherein said fluid is able to pass through said second pressure reducing valve from said piston chamber to said second intermediate conduit, and said fluid is unable to pass though said second pressure reducing valve from said source of regulated pressure when said second pressure reducing valve is in said first positon, and wherein said fluid is unable to pass through said second pressure reducing valve from said piston chamber to said second intermediate conduit, and able to pass from said source of regulated pressure through said second pressure reducing valve when said second pressure reducing valve is in said second position;
    a second check valve disposed along said second intermediate conduit allowing said fluid to pass from said second pressure reducing valve to said piston chamber and preventing said fluid from passing from said piston chamber to said second pressure reducing valve.

2. A hydraulic suspension system according to claim 1 wherein said source of regulated pressure comprises an electro-hydraulic pump with speed control to regulate the pump pressure.

3. A hydraulic suspension system according to claim 1 wherein said source of regulated pressure comprises an energy storage device.

4. A hydraulic suspension system according to claim 1 wherein said first check valve provides circulation of oil from an exhaust port of said first pressure reducing valve to an application port of said second pressure reducing valve.

5. A hydraulic suspension system according to claim 1 wherein said source of regulated pressure comprises two hydro-piloted valves.

6. A hydraulic suspension system according to claim 1 wherein said source of regulated pressure comprises a pump, and further including an energy management valve fluidly connected to said first pressure reducing valve and said second pressure reducing valves and configured to move said first and second pressure reducing valves between said first and second positions based on a pressure difference between said rod and piston chambers of said actuator.

7. A hydraulic suspension system according to claim 6 wherein said energy management valve includes a spool and is operable, in a resistive mode, to change a spool position in dependence on a pressure difference between said rod chamber and said piston chamber of said actuator.

8. A hydraulic suspension system according to claim 7 wherein pressure in each of said actuator chambers is monitored with a pilot conduit at each side of said spool.

9. A hydraulic suspension system according to claim 1 wherein said source of regulated pressure comprises one hydro-piloted valve.

10. A hydraulic suspension system according to claim 9 wherein said first and second check valves are integrated into said hydro-piloted valve.

11. A method of operating a hydraulic suspension system comprising a source of regulated pressure, an actuator having a rod chamber and a piston chamber, a first pressure reducing valve fluidly connected to the source of regulated pressure and the rod chamber of the actuator, a first intermediate conduit between the first pressure reducing valve and the piston chamber of the actuator, a second pressure reducing valve fluidly connected to the source of regulated pressure and the piston chamber of the actuator, and a second intermediate conduit between the second pressure reducing valve and the rod chamber of the actuator, the method comprising:

moving the second pressure reducing valve from a second position in which fluid is unable to pass from the piston chamber to the rod chamber and able to pass from the source of regulated pressure through the second pressure reducing valve to a first position in which said fluid is able to pass from the piston chamber to the rod chamber and unable to pass from the source of regulated pressure to through the second pressure reducing valve, thereby regulating pressures in the piston and rod chambers of the actuator, in a resistive mode by re-circulating actuator flow from the piston chamber to the rod chamber.

12. A method according to claim 11 wherein the source of regulated pressure comprises an electro-hydraulic pump with speed control to regulate the pump pressure.

13. A method according to claim 11 wherein the source of regulated pressure comprises an energy storage device.

14. A method according to claim 11 comprising check valve means circulating oil from a pressure reducing valve exhaust port of the first pressure reducing valve to an application port of the second pressure reducing valve.

15. A method according to claim 11 wherein the source of regulated pressure comprises two hydro-piloted valves.

16. A method according to claim 11 wherein the source of regulated pressure comprises a pump and wherein the hydraulic suspension system further includes an energy management valve fluidly connected to the first pressure reducing valve and the second pressure reducing valve and configured to move the first and second pressure reducing valves between the first and second position based on pressures in the rod and piston chambers of the actuator.

17. A method according to claim 16 wherein the energy management valve includes a spool and wherein the method further includes, in a resistive mode, changing spool position in dependence on a pressure difference between the rod chamber and the piston chamber of the actuator.

18. A method according to claim 17 comprising monitoring the pressure in the rod and piston chambers of the actuator with a pilot conduit at each side of the spool.

19. A method according to claim 11 wherein the source of regulated pressure comprises a hydro-piloted valve.

20. A method according to claim 19 wherein the hydro-piloted valve comprises integrated check valves.

\* \* \* \* \*